United States Patent Office 2,985,560
Patented May 23, 1961

2,985,560

PROCESS FOR THE MANUFACTURE OF ADRENO-CORTICOTROPIC HORMONE PREPARATIONS BY CARBOXYMETHYLCELLULOSE CHROMATOGRAPHY

Jan Daniel Herman Homan and Laurens Pieter Ederzeel, Oss, Netherlands, assignors to Organon Inc., West Orange, N.J., a corporation of New Jersey No Drawing. Filed June 24, 1957, Ser. No. 667,693

Claims priority, application Netherlands July 28, 1956

5 Claims. (Cl. 167—74)

This invention relates to a process for the manufacture of adreno-corticotropic hormone preparations. More particularly the invention relates to the manufacture of preparations of the adreno-corticotropic hormone which will hereinafter be indicated by the usual abbreviation ACTH.

The favorable action of these preparations produced from the pituitary anterior lobe of mammalia against various ailments such as rheumatoid arthritis, asthma, certain eye diseases and in cases of extensive burns is well known.

In the purification of preparations of ACTH various methods have been applied, such as ultrafiltration, counter current distribution, and chromatography. The most frequently applied method heretofore is that described by Astwood, in J. Am. Chem. Soc. 73, 2969-70, 1950, in which crude ACTH is adsorbed on carboxycellulose, after which it is liberated therefrom again with 0.1 N hydrochloric acid. In practice, activity yields are obtained with this method which do not exceed about 40 to 60%. It is to be noted that in the lierature, higher yields have been indicated but in practice these cannot be realized except in very rare instances.

Moreover, in the purification of ACTH preparations, strongly fluctuating yields have been obtained when applying commercial carboxycellulose. In addition a large percentage, sometimes even up to 90%, of several lots of this carboxycellulose is even useless because the yields obtained with it are very low. In many instances each yield is below 30%.

Now it was found according to the present invention that high yields can be obtained if in the manufacture of purified ACTH preparations, the ACTH is adsorbed on carboxy methyl cellulose, hereinafter indicated by CMC, in an aqueous system at a pH below about 8, after which the ACTH is elutriated or eluted at a pH which differs from that of the adsorption, in which use is made of CMC which is insoluble at the pH-values at which the adsorption and the elutriation take place.

By applying the process according to the invention yields are obtained of from 50 to 80%, dependent on the degree of purity, and the origin of the ACTH to be purified.

A great advantage of the use of CMC compared to carboxycellulose as an adsorbent is that this substance can be prepared in a reproducible manner, as a result of which few or no fluctuations in yield occur.

Because the CMC is considerably more voluminous than carboxycellulose, one has a larger contact surface, as a result of which both the adsorption and the elution or elutriation take place easier with CMC. In addition CMC has favorable properties with reference to operations which are applied during the purification, such as filtration, migration of liquids, and the like.

The process according to the invention yields especially favorable results if the ACTH is adsorbed on the CMC at a pH in the range of from 2.5 to 4.5. The elution of the adsorbate is preferably carried out with a dilute solution of a strong acid, for example a hydrohalogenic acid such as hydrochloric or hydrobromic acid, sulphuric acid or phosphoric acid. Preferably the elution is carried out at a pH lower than 2 while making use of 0.1 N hydrochloric acid. In this way the pH of the elution is lower than that of the adsorption. In some cases, however, the adsorption may be allowed to occur in a weakly acid medium, whereas the elution takes place in a weakly alkaline medium.

In the performance of the process according to the invention, the start of the process is generally made from an acidified ACTH solution. Also aqueous systems which contain a certain percentage of water miscible solvents, such as methanol, ethanol, isopropanol, acetone and dioxane, are useful. For the acidification use is preferably made of an organic acid, such as acetic acid, propionic acid, lactic acid, malic acid and the like having the same desired characteristics.

The adsorption may take place by stirring the ACTH solution with CMC and eluting it for example after filtration or centrifugation. The adsorption process may also be carried out in a column filled with CMC, after which the ACTH is eluted from this column.

The following examples, it being understood that the invention is not restricted to such examples, illustrate the invention. The activity yields mentioned herein have been determined in vitro according to the method of Saffran as described for example in Endocrinology 56, 523 (1955), because the results thereof are more reproducible and the scattering of the results is considerably slighter than in the frequently used method of M. Sayers. See Endocrinology 42, 379 (1948). The Saffran assays on which the figures in the examples are based have confidential limits of about 15% for $p=0.05$.

*Example I*

12 g. of ACTH with a potency of 0.6 I.U/mg. are dissolved in 500 ml. of 0.1 N acetic acid having a pH =3.1. Then 1 g. of CMC with a substitution level of 0.4, corresponding to 9.7% carboxyl groups, is added and the whole is stirred at room temperature for 12 hours. After filtration of the insoluble material this is then washed with 0.1 N acetic acid and subsequently eluted with 0.1 N hydrochloric acid until no protein can any longer be demonstrated in the eluate. The mother-liquor is once again stirred with 1 g. of CMC, after which the washing out and the elution are carried out as above. This eluate is added to the one already obtained. By means of an anion exchanger (Amberlite IRA-400) the chlor ions in the eluate are replaced by acetate ions.

After lyophilisation 422 mg. of ACTH are obtained with a potency of 13.5 I.U/mg., equivalent to an activity yield of 79%.

*Example II*

12 g. of ACTH with a potency of 0.6 I.U/mg. are treated in the manner as described in Example I. This time, however, the ACTH solution is brought into contact only once with CMC with a substitution level of 0.4, in contrast to the process of Example I. There are thus obtained 180 mg. of ACTH with a potency of 28.4 I.U/mg., which is equivalent to an activity yield of 71%.

*Example III*

12 g. of cattle ACTH with a potency of 0.4 to 0.5 I.U/mg. are added to 400 ml. of water which is acidified with acetic acid to a pH of 3.1. The thus obtained solution is stirred for 14 hours with 1.8 g. of CMC with a substitution level of 0.3, corresponding to a carboxyl content of 8.4. After settling the precipitate is washed a few times with 0.1 N acetic acid, after which the protein is eluted with 0.12 N HCl. The mother liquor is once again stirred with 1.8 g. of CMC, after which this CMC, too, is washed and eluted. The chlor ions from the two combined eluates are exchanged against acetate ions, after which the liquid is lyophilised. 525 mg. of ACTH are obtained herefrom with a potency of 7.0 I.U/mg., which is equivalent to an activity yield of about 68%.

*Example IV*

5 g. of ACTH with a potency of 1 I.U/mg. are dissolved in 300 ml. of water to which propionic acid is added until the pH has a value of 4.5. The solution is then stirred for 20 hours with 2.5 g. of CMC of the same type as in Example III. The solid substance is removed by centrifugation and subsequently the ACTH is eluted by washing a few times with 0.1 N HCl. The eluate is precipitated in the cold with a tenfold excess of acetone. 225 mg. are obtained of a preparation with a potency of 12.3 I.U/mg., which is equivalent to an activity yield of 55%.

*Example V*

10 g. of ACTH with a potency of 0.8 I.U/mg. are dissolved in 500 ml. of water while adding lactic acid to a pH of 2.7. The solution is stirred for 22 hours with 2 g. of CMC of the same type as indicated in Example III. After settling and decanting a few times with a lactic acid solution with a pH of 2.7, elution is then carried out with 0.2 N sulphuric acid and the eluate is precipitated in the cold with an excess of acetone. There are obtained 283 mg. of a preparation with a potency of 15.0 I.U/mg., which is equivalent to an activity yield of 53%.

*Example VI*

8 g. of crude ACTH with a potency of 0.8 I.U/mg. are dissolved in 400 ml. 10% ethanol while adding acetic acid to obtain a pH=3.2. This solution is stirred for 22 hours with 2 g. of CMC of the same type as indicated in Example III, and after settling and decanting a few times with 0.1 N acetic acid eluted with 0.12 N HBr. The bromo ions are exchanged against acetate ions with an anion exchanger to a pH of about 3, after which the solution is lyophilised. The yield of purified ACTH with an activity of 16.2 I.U/mg. amounts to 253 mg., which is equivalent to an activity yield of 64%.

*Example VII*

3 g. of ACTH, acid acetone powder, prepared according to the extraction method of Li, described in J. Am. Chem. Soc. 74, 2124, 1952, with a potency of 2.8 I.U/mg. are dissolved in 100 ml. of water. While stirring 1 N NH$_4$OH is added until the pH has a value of 2.8. Subsequently 3 g. of CMC with a substitution level 0.5, are added to the solution. The mixture is then stirred for 25 hours. After settling of the solid substances, the latter are separated, washed a few times with 0.1 N acetic acid, and subsequently eluted with 0.1 N HCl. The mother liquor is again stirred with 3 g. of CMC for 25 hours, after which the solid substance is separated and washed, after which herefrom, too, the protein is eluted by means of a 0.1 N solution of hydrochloric acid.

In the combined eluates the chlor ions are exchanged against acetate ions, after which the solution is lyophilised. In this way 308 mg. of ACTH with a potency of 20.8 I.U/mg. are obtained, which is equivalent to an activity yield of 76%.

*Example VIII*

12 g. of ACTH with a potency of 0.6 I.U/mg. are dissolved in 500 ml. of 0.1 N acetic acid, the pH is 3.1. The solution is stirred for 24 hours twice with 0.5 g. of CMC with a substitution level of 0.4. The solid substance is washed, after separation, with 0.1 N acetic acid and subsequently eluted with 0.1 N HCl. In the combined eluates, the chlor ions are exchanged against acetate ions, after which the solution is lyophilised. In this way 322 mg. of ACTH with a potency of 14.8 I.U/mg. are obtained, which is equivalent to an activity yield of 66%.

*Example IX*

300 mg. of the ACTH obtained in Example VIII above with a potency of 14.8 I.U/mg. are dissolved in 6 ml. of an ammonium acetate solution, as a result of which a pH is obtained of 6.3. The mixture is brought to a temperature of 0–10° C., brought on a chromatography column of CMC with a substitution level of 0.15 which has previously been brought in equilibrium with the said ammonium acetate solution. At the said temperature, the chromatogram is developed with the ammonium acetate solution for such a long time that all the inactive components are removed from the column with the outflowing liquid. Subsequently elution is carried out, also at a temperature of 0 to 10° C., of the active constituent with a buffer of ammonium acetate and ammonium hydroxide which has a pH of 8.5. The resulting eluate is lyophilised as such, and as a result of which 56 mg. of ACTH are obtained with a potency of 48.6 I.U/mg., which is equivalent to an activity yield of 61%.

From the foregoing description taken in conjunction with the accompanying examples it will be noted that there is provided a method of purifying preparations of ACTH so that the yield may be anywhere from 50 to 80% dependent on the degree of purity and on the origin of the ACTH purified. Such purity is attained by the proper use of carboxy methyl cellulose in an aqueous system at a pH below 8, such carboxy methyl cellulose having a high degree of contacting adsorbing surface.

While various examples have been given it is to be understood that changes and modifications may be made without departing from the spirit and scope of the invention as claimed.

We claim:

1. Process for the manufacture of purified ACTH preparations which comprises adsorbing ACTH on an adsorbent consisting essentially of carboxymethylcellulose in an aqueous system at a pH between about 2.5 and about 8.0, eluting the ACTH from said carboxymethylcellulose at a pH which differs from that of the adsorption and which is between about 0.1 and about 8.5, the said carboxymethylcellulose being insoluble at the pH values at which the adsorption and the elution take place.

2. The process according to claim 1, wherein the adsorption takes place at a pH in the range from 2.5 to 4.5.

3. The process according to claim 1, wherein the elution is carried out at a pH lower than 2.

4. The process according to claim 1, wherein the elution is carried out with 0.1 N hydrochloric acid.

5. The process according to claim 1, wherein the adsorption and elution are carried out in a chromatography column.

References Cited in the file of this patent

UNITED STATES PATENTS

| | | |
|---|---|---|
| 2,669,536 | Bunding | Feb. 16, 1954 |

FOREIGN PATENTS

| | | |
|---|---|---|
| 163,359 | Australia | June 16, 1955 |
| 532,438 | Canada | Oct. 30, 1956 |

OTHER REFERENCES

Ralli: Adrenal Cortex, 1951, p. 30.

Astwood: J.A.S.C., vol. 73, June 1951, pp. 2969 and 2970.

Koch: J. Am. Chem. Soc., vol. 77, 1955, pages 489–491.